United States Patent [19]
Rivere

[11] 3,780,587
[45] Dec. 25, 1973

[54] METHODS OF MEASURING INSTANTANEOUS MEAN PRESSURES IN FLUID MEDIA

[75] Inventor: Jean-Pierre Rivere, Billancourt, France

[73] Assignees: Rugie Nationale Des Usines Renault, Billancourt; Automobiles Peugeot, Paris, both of France

[22] Filed: Mar. 10, 1972

[21] Appl. No.: 233,629

[30] Foreign Application Priority Data
Mar. 19, 1971 France .............................. 7109831

[52] U.S. Cl. ................ 73/398 R, 73/115, 73/117.3
[51] Int. Cl. .............................................. G01l 9/00
[58] Field of Search .................. 73/115, 116, 117.3, 73/392, 389, 398 R, 398 AR

[56] References Cited
UNITED STATES PATENTS
3,625,054  12/1971  Vesper et al. ........................ 73/115

Primary Examiner—Donald O. Woodiel
Attorney—Richard K. Stevens et al.

[57] ABSTRACT

Apparatus for measuring a pressure, applicable notably to the specific case of a fluid volume output in a conduit, in which a pressure pick up having a very short response time translates the instantaneous pressure into the form of an electric signal amplified and transformed into a voltage fed to an electric integrator determining the means pressure. At least one pick up emits an electric signal during at least one fraction of the period for controlling the release of the integrator, its integration period and the resetting thereof.

The apparatus is applicable *inter alia* to systems for injecting fuel into internal combustion engines.

12 Claims, 2 Drawing Figures

METHODS OF MEASURING INSTANTANEOUS MEAN PRESSURES IN FLUID MEDIA

The present invention relates to methods of measuring a substantially instantaneous and continuous mean pressure of a fluid medium in which pressure waves of a pulsatory character are propagated.

The difficulties arising when attempting to determine the relationship between volumes of fluid circulating in a constant-section or variable-section conduit during a predetermined time $T_o$, and the driving pressure controlling the rate of flow of the fluid, when said driving pressure is of pulsatory nature, i.e. varies periodically as a function of time, are well known.

A simple method of determining the relationship between the volumetric output $V_o$ and this pulsated pressure consists of calculating the mean constant pressure that would be necessary for delivering the same $V_o$ during the same time $T_o$ and for a given frequency. This problem arises for instance with nozzles or tuyeres operated under pulsated flow or regime conditions for the measurement of outputs, or in fuel injection systems wherein the essential adjustment parameters are the mean pressure prevailing in the induction pipe and a speed relationship permitting the operation of an internal combustion engine under constant mixture-richness conditions.

In modern motor vehicles the necessity of obtaining a pollution-free adjustment makes it increasingly necessary to have a clear knowledge of this instantaneous pressure with a high degree of precision to have it almost instantaneously.

It is the essential object of the present invention to provide apparatus for measuring such instantaneous pressure and one that may be used in any mechanical system of which the periodic operation generates in synchronism periodic pressure waves.

The mean pressure measuring apparatus of this invention performs the following:

1. Translates the instantaneous pressure in the form of an electric amplified signal emitted from a pressure pick-up having a very short response time and converting this signal into a voltage proportional to said pressure, this voltage being fed to an electric integrator determining in turn the mean pressure.
2. Controls the integrator actuation, its integration period and the resetting thereof at the end of this period, before producing the following integration, by using at least one period pick up device responsive to members generating pressure pulsations and capable of emitting an electric signal during at least one fraction of said period.
3. Transmits the result of each integration to a relay memory of which the preceding information is transmitted to a computer, for proper utilization, in the preliminary integration period during which it is available, with subsequent resetting of said memory for receiving the result of the next integration.

It is another object of this invention to utilize this measuring apparatus in the regulation of the fuel feed of internal combustion engines, by considering the amount of air necessary for filling the engine cylinders as a known function of the mean absolute pressure thus measured in the induction manifold. The integration of the pressure may be made on a number of revolutions which is a multiple equal to or higher than a period such as a fraction of a revolution of the engine crankshaft, for example half a revolution.

More particularly, this apparatus for measuring the mean pressure performs the following:

a. Translating the pulsated pressure in the form of an electric signal emitted from a pressure pick up or detector having a very short response time and responsive to the pressure of the fluid stream or flow;

b. Translates in a series of amplifiers responsive to the pressure pick up or detector the electric magnitude emitted from said pick up or detector as a function of the fluid pressure, into a voltage proportional or not, according to particular requirements, to the instantaneous pressure measured by said pressure pick up or detector;

c. Controls the series of amplifiers of an electric integrator delivering a mean pressure value;

d. Detects by means of electro-mechanical or simply mechanical pick-up devices one or a plurality of periods and/or fraction of a period from the movements of the mechanical parts or members generating the pulsated pressure, said pick-up devices serving the purposes of:

starting or releasing the integration by the above-mentioned integrator from a periodicity reference mark of said mechanical parts or members;

detecting the complete selected integration period, and controlling the end of the integration when the period or periods and/or the period fraction of the movement of said mechanical parts or members are measured.

e. Transmits the result of this integration through transfer means to an electric memory system (of analogical, digital or hybrid type);

f. Resets the integrator subsequently to the data transfer, thus permitting another integration with a minimum idle time between successive integrations in order to minimize the possibility of errors in the determination of the mean pressure;

g. Preserves in an analogical, digital or hybrid type electric memory the data concerning the mean pressure, in the form of a voltage, during a time corresponding substantially to the integration time, this data being thus available during this integration period for calculation purposes;

h. Resets the electric memory after the data contained therein has been utilized;

i. Transmits this information through an (optional) analogical-digital converter to permit the direct control of an automatic digital or analogical computing system.

The device obtained by the practical application or embodiment of this apparatus may comprise synchronizing means for distributing the mean pressure data to one or several points of an automatic analogical or digital computing system.

A typical example of practical applicaton of the apparatus of this invention in the regulation of an internal combustion engine will be illustrated as the following description proceeds with reference to the accompanying drawings, in which.

Figure 1:
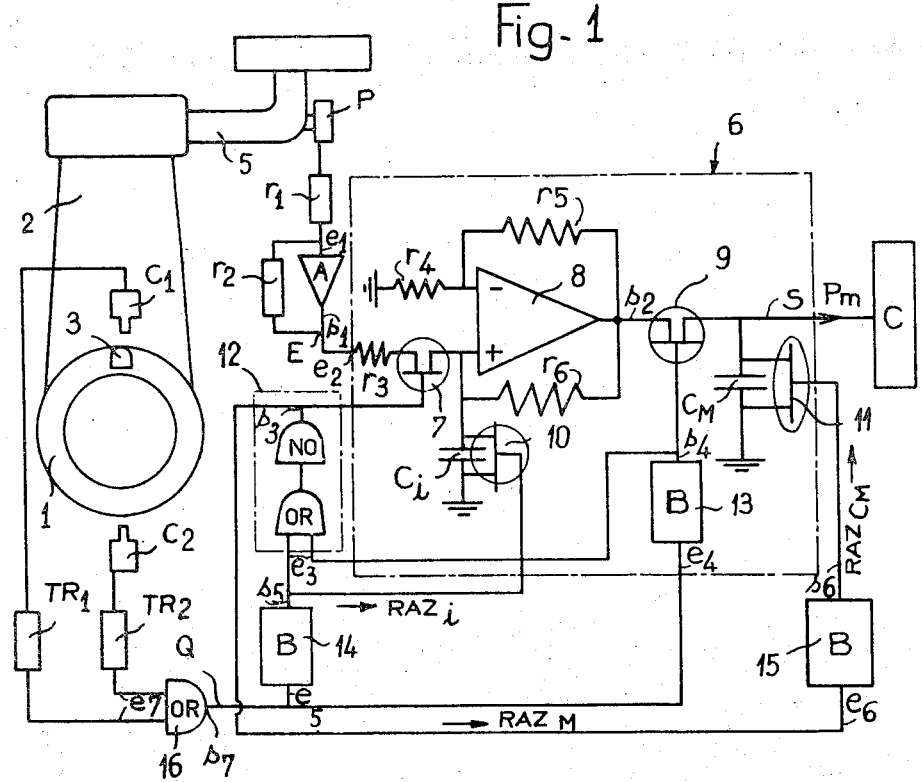
FIG. 1 is a general diagram of a practical embodiment of the apparatus of this invention.

Referring first to the diagram of FIG. 1, the flywheel 1 of an engine 2 is provided with at least one boss or projection 3 adapted to be detected by proximity pick up means $C_1$ and $C_2$ (of electrostatic or electromagnetic type). This arrangement is attended by the following advantages:

elimination of scarcely reliable mechanical or electrical contacts likely to operate erratically;
nearly perfect angular timing of the crankshaft.

A pressure pickup or detector P having a very short response time is inserted at a suitable location into the induction manifold or pipe 5. An elementary observation is sufficient for finding, for example in the case of a four cylindered engine, that the pressure wave circulating in the induction manifold or pipe is of periodic nature and has a period corresponding to half a crankshaft revolution, provided however that the engine operating conditions are stabilized. However, during the transitory phases the filling of the engine cylinders with air is substantially a linear function of the absolute mean pressure prevailing in the induction pipe 5; therefore, there is no inconvenience whatsoever in utilizing the notion of "mean pressure" even in transient phases of acceleration or deceleration.

The pick up P is connected via a resistor $r_1$ to an amplifier A adapted to convert the variable magnitude generated in said pick up P by the pulsating pressure into an electric voltage E proportional to said pulsating pressure. A feedback resistor $r_2$ is inserted between the input $e_1$ and output $s_1$ of amplifier A. This amplifier is a voltage amplifier if a quartz pick up P is used, and a current-voltage converter if the pick up P is of the strain gage type, transistorized or not. The voltage E is fed to the input $e_2$ of an electric integrator designated in general by the reference numeral 6.

This integrator comprises an input resistor $r_3$ connected to a field-effect transistor 7 (designated by the letters FET) connected in turn to the + terminal of an operational amplifier 8 having its minus terminal grounded through a resistor $r_4$, other resistors $r_6$ and $r_7$ being connected in parallel with this amplifier. The output $s_2$ of the operational amplifier is connected to another field effect transistor 9 connected to the output S of integrator 6 connected in turn to a computer C.

A capacitive memory $C_i$ is connected between the + terminal of operational amplifier 8 and the ground and a field effect transistor 10 is connected on either side of this memory $C_i$. Another buffer-memory comprising a capacitor $C_M$ is connected between the output S of the integrator and the ground, and a field effect transistor 11 is connected across the terminals of capacitor $C_M$.

An OR-NO gate 12 controls with its output $s_3$ the transistor 7, and a monostable multivibrator B 13 controls with its output $s_4$ the transistor 9, this output being also connected to one of the inputs $e_3$ of gate 12 having its other input connected to the output $s_5$ of a monostable multivibrator B 14. A monostable multivibrator B 15 controls with its output $s_6$ the field effect transistor 11, and has its input $e_6$ connected to the output $s_3$ of gate 12.

The boss or projection 3 adapted to be detected by the proximity pick ups $C_1$ and $C_2$ causes the integration to take place every half-revolution of the engine crankshaft. Each pick up is connected to a Schmidt multivibrator or trigger $TR_1$ or $TR_2$ connected to the inputs $e_7$ of an OR gate 16 having its output $s_7$ connected on the one hand to the input $e_5$ of multivibrator 14 and on the other hand to the input $e_4$ of the multivibrator 13 of integrator 6.

The integration sequence takes place as follows:

The boss or like reference projection 3 moves past a proximity pick up $C_1$ and $C_2$. In case, for example, the proximity pick up is of the electrostatic release or trigger type, it will deliver a shaping pulse to the Schmidt multivibrator $TR_1$, for example, in order to normalize this pulse in the form of a rectangular signal wave or gating pulse Q traced at the output $s_7$ of gate 16.

This gating pulse Q permits the content of the capacitive memory $C_i$ to be transferred into the buffer memory capacitor $C_M$ by locking the field effect transistor 9 during the time necessary for the faultless transfer from capacitor $C_i$, this time being gaged by the monostable multivibrator 13 actuated by the gating pulse Q.

The gating pulse Q also actuates the monostable multivibrator 14 having the function of discharging capacitor $C_i$ by controlling the field effect transistor 10, thus permitting the integration of the signal when the field effect transistor 7 behaves like a closed switch.

It is clear that the resetting (RAZ) of memory $C_i$ will take place on the downward slope or side of the pulse delivered by the monostable multivibrator 14 of which the tipping time T' must be longer than the tipping time T of the monostable multivibrator B 13.

The OR - NO gate 12 prevents the ingress of the signal emitted from amplifier A which corresponds to the voltage equivalent of the fluid pressure, during the phase in which the information is transmitted from $C_i$ to $C_M$, and during the resetting of capacitor $C_i$. In fact, each time the multivibrators 13 or 14 are in their energized condition 1, the output of OR - NO gate is 0 and the O-signal locks the transistor 7 at the output side of the gate. The integration is also prevented during the resetting period.

An ancillary circuit $RAZ_M$ may be used, if desired, for resetting the capacitor $C_M$. The mean pressure signal Pm issuing from S is directed to the computer C.

Figure 2:
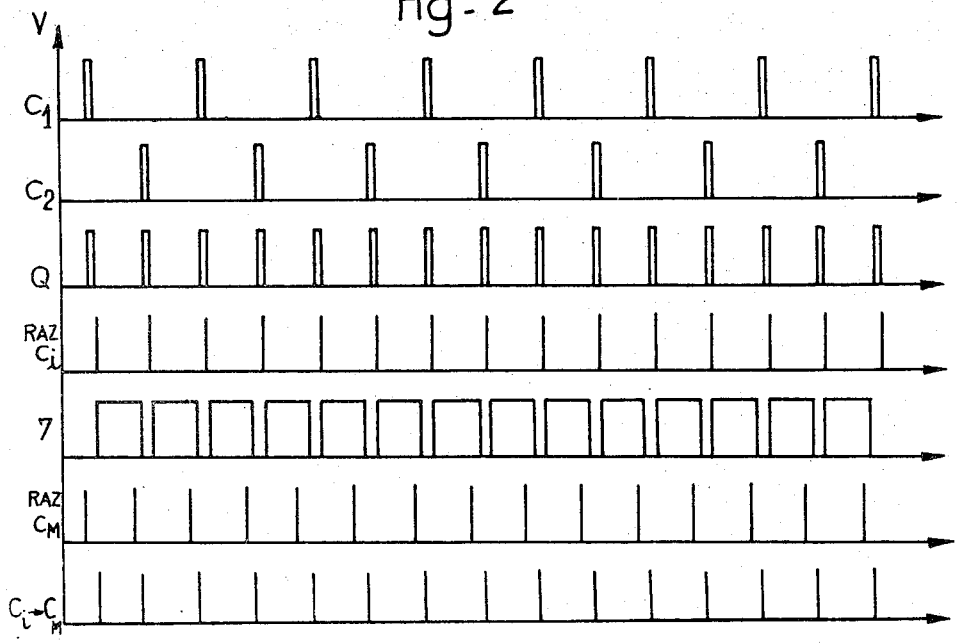
FIG. 2 is a wave diagram illustrating the mode of operation of the integrator.

The sequential diagram of operation of the integrator as shown in FIG. 2 illustrates diagrammatically the relative positions of the various voltage pulses. The successive impulse lines $C_1$ and $C_2$ designate the pulses of the position pick ups. The pulse line Q designates the pulses saturating the transistor 9 in order to permit the transfer of the content of capacitor $C_i$ into the memory $C_M$ at the end of the integration process. The following line RAZ $C_i$ illustrates at the same pulse frequency the resetting of the integration capacitor $C_i$. The pulse line 7 illustrates on the other hand the integration phase during which the mean pressure Pm is calculated, this phase being released after each resetting of integration capacitor $C_i$ of the preceding line. The penultimate line RAZ $C_M$ shows the pulses for resetting the capacitor $C_M$ of the relay memory, after the transmission of the mean pressure information Pm to computer C, this resetting occurring before the end of the integration phase concerning the next information shown in line 3 and to be transmitted thereto. Finally, the last line illustrates the order for transferring the "mean pressure" information contained in capacitor $C_i$ to the memory capacitor $C_M$.

This diagram is given by way of illustration, for many other types of sequential control means may be conceived by those skilled in the art on the basis of the principles of this invention, for performing the following functions:

transferring, resetting $C_i$,
integrating,
resetting of $C_M$,
calculating the mean pressure $Pm$,
without departing from the scope of the invention, or for obtaining a sequence leading to a mean pressure from a pulsated pressure. This measuring method is applicable to various fields of the motor industry, such as:

electronic fuel injection systems,
determination of the optimum electronic ignition point,
joint determination of the injection time and ignition point,
controlling automatic gear change transmissions.

It is also applicable, in a considerable wider field, to the regulations of engines of all types, as well as to industrial processes wherein a continuous control of operating parameters from pressures having a pulsatory variation regime is required.

What is claimed as new is:

1. Apparatus for measuring mean pressure of a fluid medium in which pulsated waves are produced comprising:
  a. means for detecting the instantaneous fluid medium pressure and forming voltage signals proportional to said pressure;
  b. an electronic integrator, responsive to said voltage signals, for determining signals corresponding to the mean pressure of said fluid medium, said integrator including an operational amplifier, a first field effect transistor connected between said detecting means and said amplifier, a first capacitive memory connected to an input of said amplifier and being charged through said first transistor, a second field effect transistor connected on either side of said first memory, a third field effect transistor connected to the output of said amplifier, a second capacitive buffer memory being charged through said third field effect transistor, and a fourth field effect transistor connected across the terminals of said second memory; and
  c. means for controlling the operation of said integrator including means for periodically initiating the integration operation, a first multivibrator, having an input connected to said initiating means and an output connected to said second transistor, an or-no gate having a first input connected to the output of said first multivibrator and an output connected to said first transistor, a second multivibrator having an input connected to said initiating means and an output connected to said third transistor and a second input of said gate, and a third multivibrator having an input connected to the output of said gate and an output connected to said fourth transistor.

2. The apparatus of claim 1 wherein said means for detecting comprises a quartz pick-up and a voltage amplifier connected to said pick-up.

3. The apparatus of claim 1 wherein said means for detecting comprises a strain gauge pick-up and a current-voltage converter connected to said pick-up.

4. The apparatus of claim 1 wherein said means for initiating comprises an electromagnetic proximity pick-up spaced apart from the fluid medium.

5. The apparatus of claim 1 wherein said means for initiating comprises an electrostatic proximity pick-up spaced apart from the fluid medium.

6. The apparatus of claim 1 wherein during a first period said gate triggers said first transistor to charge said first memory, said third multivibrator triggers said fourth transistor during said first period to reset said second memory, said first and second multivibrator trigger said second and third transistors, respectively, during a second period to transfer energy stored in said first memory to said second memory, said first memory being reset prior to being charged, said second memory being discharged prior to receiving energy transferred from said first memory.

7. The apparatus of claim 6 wherein the energy transferred to said second memory is stored therein during a time period corresponding substantially to the period said first memory is being charged.

8. The apparatus of claim 6 wherein the energy stored in said second memory is discharged to a digital computer via an analog-to-digital converter.

9. The apparatus of claim 6 wherein said energy stored in said second memory is discharged to different points of an automatic computer through a synchronizing system.

10. The apparatus of claim 1 further comprising an internal combustion engine having an induction pipe, said means for determining including a pressure pick-up disposed on said induction pipe wherein the amount of air necessary for filling the cylinders of the engine is taken as a mean absolute pressure in said pipe and the mean pressure is measured during transitory acceleration and deceleration phases.

11. The apparatus of claim 10 wherein said internal combustion engine comprises a crankshaft and the periodic initiation occurs every half-revolution of the crankshaft.

12. The apparatus of claim 10 wherein said internal combustion engine comprises a crankshaft and the period initiation occurs at multiples of a half-revolution of the crankshaft.

* * * * *

UNITED STATES PATENT OFFICE
CERTIFICATE OF CORRECTION

Patent No. 3,780,587            Dated December 25, 1973

Inventor(s)   Jean-Pierre RIVERE

It is certified that error appears in the above-identified patent and that said Letters Patent are hereby corrected as shown below:

In the heading of the Patent, please correct the spelling of the first assignee:

From  "Rugie Nationale des Usines Renault"

To -- Regie Nationale des Usines Renault --

Signed and sealed this 9th day of July 1974.

(SEAL)
Attest:

McCOY M. GIBSON, JR.          C. MARSHALL DANN
Attesting Officer             Commissioner of Patents